July 28, 1964 L. SHELTON ETAL 3,142,322
MACHINE FOR PROCESSING EGGS AND EGG PRODUCTS
Filed Feb. 23, 1962 8 Sheets-Sheet 1

Inventors:
Leonard Shelton
Ralph N. Beebee
Kenneth G. Jones
Robert G. Bush
By Schneider, Dressler, Goldsmith & Clement
Attorneys.

July 28, 1964  L. SHELTON ETAL  3,142,322
MACHINE FOR PROCESSING EGGS AND EGG PRODUCTS
Filed Feb. 23, 1962  8 Sheets-Sheet 2

Inventors:
Leonard Shelton
Ralph N. Beebee
Kenneth G. Jones
Robert G. Bush
By Schneider, Dressler, Goldsmith & Clement
Attorneys.

July 28, 1964 L. SHELTON ETAL 3,142,322
MACHINE FOR PROCESSING EGGS AND EGG PRODUCTS
Filed Feb. 23, 1962 8 Sheets-Sheet 4

Inventors:
Leonard Shelton
Ralph N. Beebee
Kenneth G. Jones
Robert G. Bush
By Schneider, Dressler, Goldsmith & Clement
Attorneys July 28, 1964   L. SHELTON ETAL   3,142,322
MACHINE FOR PROCESSING EGGS AND EGG PRODUCTS
Filed Feb. 23, 1962   8 Sheets-Sheet 5

July 28, 1964  L. SHELTON ETAL  3,142,322
MACHINE FOR PROCESSING EGGS AND EGG PRODUCTS
Filed Feb. 23, 1962  8 Sheets-Sheet 7

Inventors:
Leonard Shelton
Ralph N. Beebee
Kenneth B. Jones
Robert G. Bush
By Schneider, Dressler, Goldsmith & Clement
Attorneys.

July 28, 1964 L. SHELTON ETAL 3,142,322
MACHINE FOR PROCESSING EGGS AND EGG PRODUCTS
Filed Feb. 23, 1962 8 Sheets-Sheet 8

United States Patent Office 3,142,322
Patented July 28, 1964

3,142,322
MACHINE FOR PROCESSING EGGS AND
EGG PRODUCTS
Leonard Shelton, 7709 Poppleton Plaza, Omaha, Nebr.,
Ralph N. Beebee, Omaha, Nebr., and Kenneth G. Jones
and Robert G. Bush, Green Bay, Wis.; said Beebee,
said Jones, and said Bush assignors to said Shelton
Filed Feb. 23, 1962, Ser. No. 174,966
10 Claims. (Cl. 146—2)

This invention relates to a machine for processing eggs and egg products and, particularly, to such a machine which is capable of automatically handling eggs during the feeding, opening, and separating operations. Furthermore, the machine is capable of selectively dumping and collecting the various egg products and for washing and sanitizing the egg handling apparatus.

Up until recent times, egg processing was essentially a manual operation since no machines were available that were capable of handling eggs which are very fragile due to the extreme brittleness of their shell.

It can be readily appreciated that due to the fragile character of eggs they must be held in place in a firm, yet gentle manner. This is necessary so that the shell of the egg will not be shattered during the cutting operation. This can be accomplished by cutting the egg with a sharp impact so that when the shell is split open there are no fragments to mix with the contents of the egg.

Furthermore, since eggs vary appreciably as to size, as to yolk color, as to solids content, and as to quality, a machine to be commercially successful must be capable of separately collecting the commonly found variety of egg products. Thus, provisions must be made to collect separately normal egg whites and yolks, dark or premium yolks, mixed whites, and inedible yolks and whites. In order to prevent the contamination of a subsequent egg by a previous one, some means has to be provided to wash the egg handling apparatus. If this can be accomplished automatically, there will be no need to shut down the entire operation every time a bad egg is fed into the machine. In addition, the egg handling apparatus should be capable of handling cracked eggs or leaking eggs in order to give it the broadest possible versatility.

Eggs are usable as whole eggs, or the egg yolk and egg albumen are collected and used separately. Eggs have a varying solids content and according to the Department of Agriculture classification, a premium is paid for "yolks" which are classified as egg products having a solids content of 43%. Egg products including egg yolks and egg whites having less than 43% solids content are called blended eggs and command a lower price. In view of this price structure, it is very desirable that any egg processing machine be capable of accurately separating, collecting, and blending the egg yolk and albumen, or white, as it will be hereinafter referred to, so as to be able to obtain the desired solids content.

By using the manual and semi-automatic methods widely employed today an individual can only crack and separate approximately twenty cases of eggs per eight-hour day. With a machine as that disclosed herein, in which thirty-six egg breaking and separating units are used and in which the eggs are automatically fed into the egg handling apparatus, two hundred cases per day can be handled by one operator. The handling speed is in effect determined by the number of egg breaking and separating units the machine may carry, the speed at which the machine is operated, and by the effective speeds of the control operator who performs the selection functions and codes each breaking and separating unit on the machine when inspecting the eggs being handled thereby. With an experienced operator the two hundred cases per day could be raised by an appreciable amount.

In accordance with the present inventon, there is provided a novel machine for processing eggs and egg products, which machine is capable of handling at a high rate of speed eggs of varying sizes, shapes, and conditions. The machine includes an egg feeder mechanism which automatically supplies eggs to a plurality of egg breaking and separating units mounted on a moving carrier. The egg breaking and separating units are actuated by control mechanisms located on a stationary member to operate the various components of the individual units.

The egg breaking and separating units receive the eggs from a feeder mechanism, clamp the eggs in position in an egg holding means, crack the eggs, separate the egg halves, and dump the contents thereof into egg yolk and egg white receiving containers disposed beneath the egg breaking head assembly. After the egg products are collected, the egg cups are inspected and a selection apparatus is actuated to dump the egg products into containers provided for this purpose. The separating units are positioned by the selection apparatus so that the cups will be dumped by suitable controls on the drum into appropriately placed collecting pans. In the instant case, provisions are made to collect selectively good yolks, premium yolks, and inedible yolks, and good whites, mixed whites, and inedible whites.

After the egg products have been dumped, the egg breaking and separating units are automatically washed if they have handled contaminated egg products. The selective washing system operates in conjunction with the apparatus for selectively dumping the egg products. Thus, if the operator, after inspecting the egg products, finds that the viewed egg products would contaminate a subsequent egg, the setting of the units selectively to dump the contaminated egg products positions the unit to be engaged by apparatus to move the unit through a cleaning cycle. This permits the heads to be washed selectively without having to shut down the machine, and has the further advantage that by not having to wash every head in order to clean one that has been contaminated, the egg products normally adhering to the egg collecting cups will not be washed away. This results in a substantial saving to the egg processor.

As previously mentioned, egg yolk solids having a predetermined solids content, i.e., 43%, command a premium price. With this machine, the units can be adapted to collect separately egg yolks and egg whites, or in selected units the separate yolk and white cups can be replaced with a cup to collect whole eggs in the place normally provided for the yolk cup. In this way, the operator can finely control the solids content of the products received from the eggs being processed. This amounts essentially to a blending operation, since in effect, the whole eggs will be blended with the egg yolks. However, it should be appreciated that such a substitution may be made for any desired purpose and that substitution may be made at any number of units about the machine or even all such units if it is desired to accumulate whole eggs.

The structure by which the above and other advantages of the present invention are attained will be described in the following specification, taken in conjunction with the accompanying drawings illustrating a preferred structural embodiment of the invention, in which.

Figure 1:
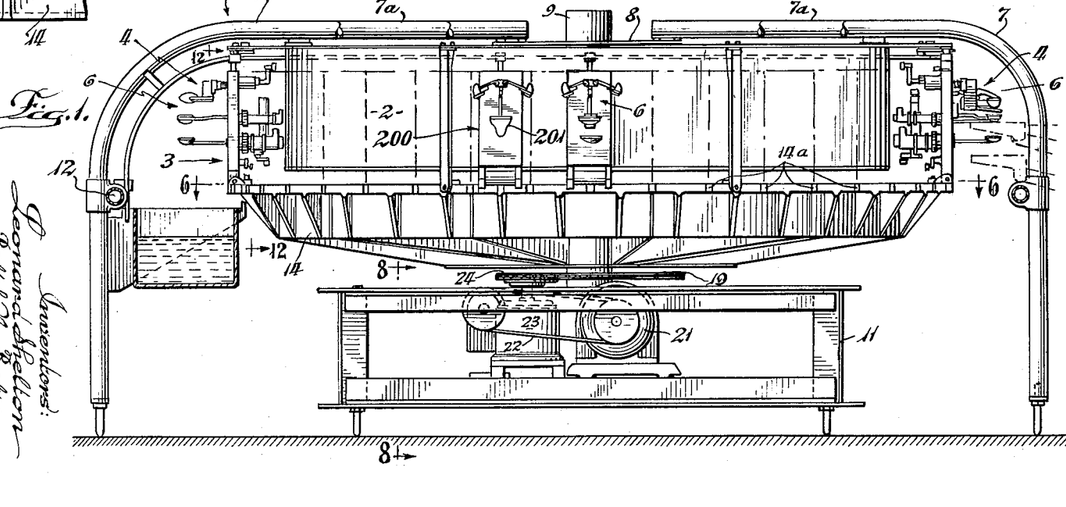
FIGURE 1 is an elevational view, partially in section, of an egg breaking, blending, and separating machine operative with a plurality of units for egg breaking and separating, or otherwise handling the egg products.
Figure 2:
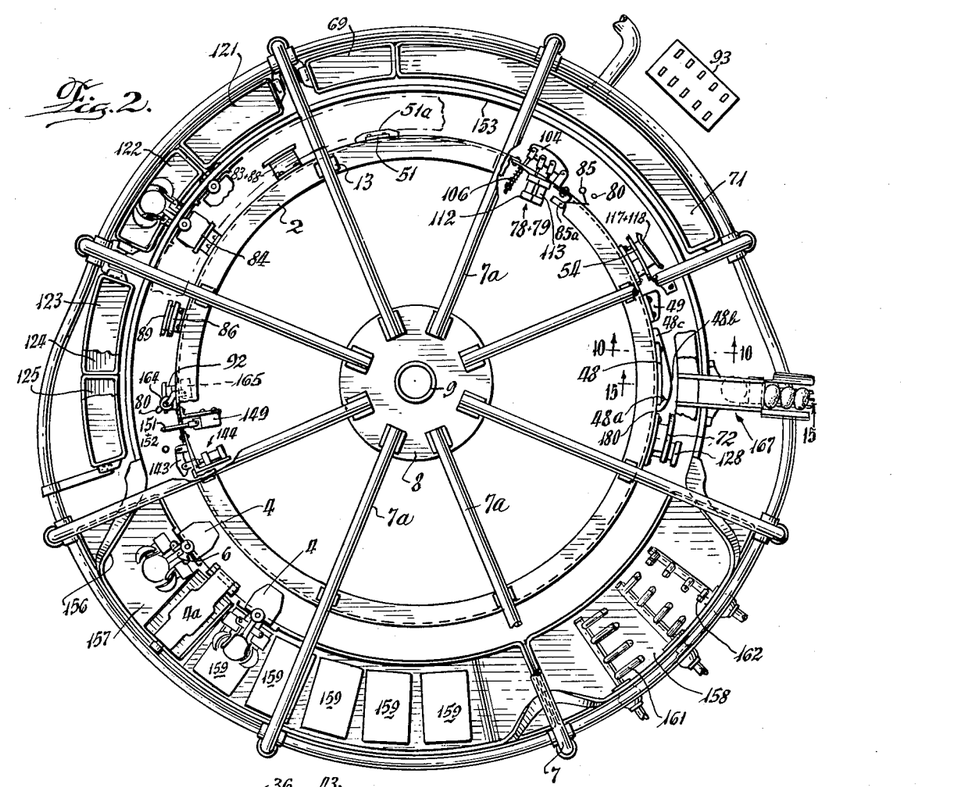
FIGURE 2 is a plan view of the egg braking and separating machine shown in FIGURE 1.

As shown in FIGURES 1 and 2, the main structural components of the illustrated machine consist of a supporting structure 1 that carries a fixed cam support or drum 2, and a generally cylindrical rotatable carrier 3 that is driven by an appropriate drive mechanism located beneath the drum and carrier. The carrier supports a plurality of egg breaking and separating units 4, each having an egg breaking head 6.

The stationary drum 2 is supported within and by a plurality of circumferentially spaced inverted L-shaped spokes 7 that rest on the floor. The radially extending arm 7a of each of the spokes 7 is welded to a circular plate 8 that is connected to the top of the drum. The plate 8 is secured to a vertically extending tubular column 9 that is in turn supported by a rectangular frame structure 11 located beneath the drum and carrier (see FIGURES 1 and 6). The spokes 7 are interconnected by a tubular member 12 extending completely around the machine. Brackets 13 fastened to the drum and spokes are also provided to support the outer portion of the drum from the spoke arms 7a.

Figure 5:
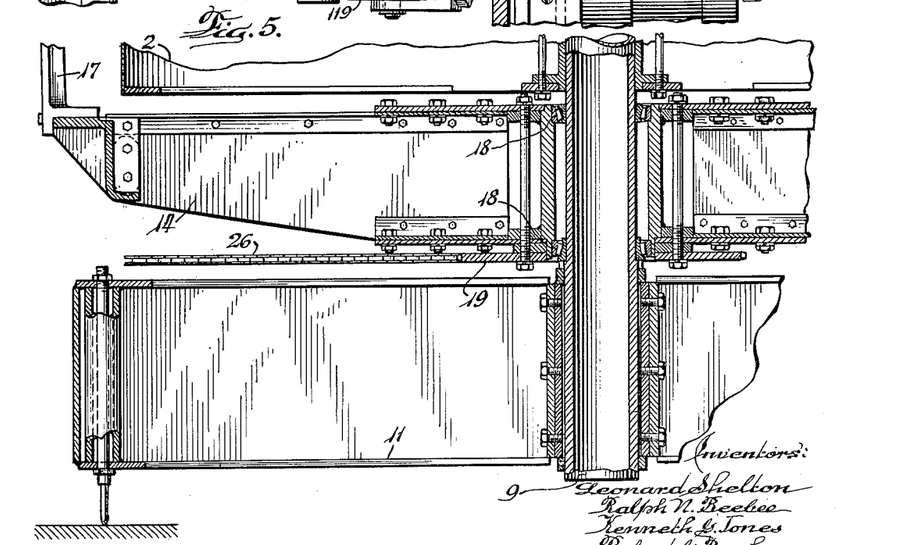
FIGURE 5 is an enlarged sectional view taken along lines 5—5 of FIGURE 6 and illustrates the supporting structure for the carrier on which the egg breaking and separating units are mounted.
Figure 12:
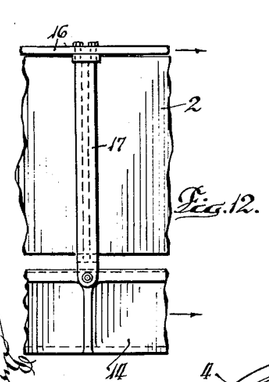
FIGURE 12 is a partial elevation view taken along lines 12—12 of FIGURE 1 showing portions of the carrier structure.

The carrier 3 consists of a lower support ring 14 and an upper latch ring 16 that are interconnected by a plurality of circumferentially spaced, vertically extending support posts 17 (see FIGURE 12). As shown in FIGURE 5, the carrier is rotatably supported on the column 9 by bearings 18.

The drive mechanism for rotating the carrier is located within and supported by the lower frame structure 11.

Figure 6:
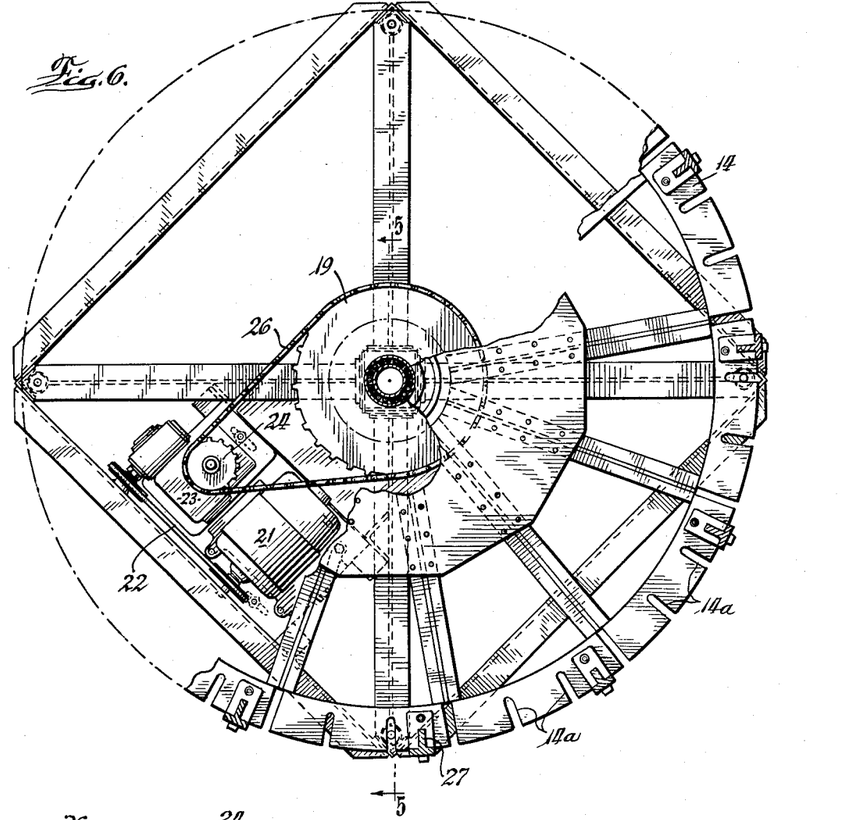
FIGURE 6 is a plan sectional view of the carrier and drive therefor taken generally along lines 6—6 of FIGURE 1.
Figure 8:
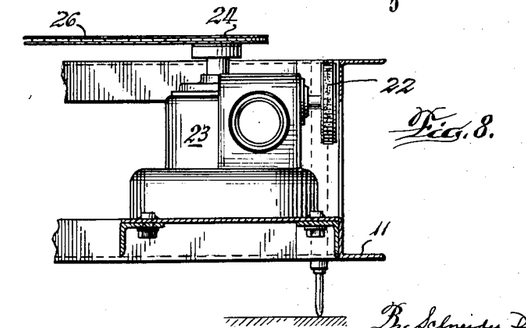
FIGURE 8 is a view of the driving mechanism for the carrier taken along lines 8—8 of FIGURE 1.

The mechanism includes a sprocket 19 secured to the lower carrier ring 14, which sprocket is driven by motor 21, pulley 22, gearing 23, sprocket 24, and chain 26 (see FIGURES 1, 6, and 8).

Each of the egg breaking and separating units 4 is supported by the lower carrier support ring 14 through a downwardly extending flange portion 27 that fits into a circumferentially spaced slot 14a cut into the lower carrier support ring. The units are secured in place to ring 14 by clamping bolt 28 (see FIGURE 4). The main body of the units is pivotally mounted at 29 on the lower support ring to facilitate washing of the units, which will be described in detail hereinafter. The units 4 are held in an upright position on the carrier 3 by a cam controlled latch mechanism 31 carried by the rotating latch ring 16 (see FIGURES 4 and 13).

The releasable latching mechanism, which will be described in detail hereinafter, is provided so the egg breaking and separating units can be dropped into washing, rinsing, and sanitizing tanks provided for this purpose.

Figure 3:
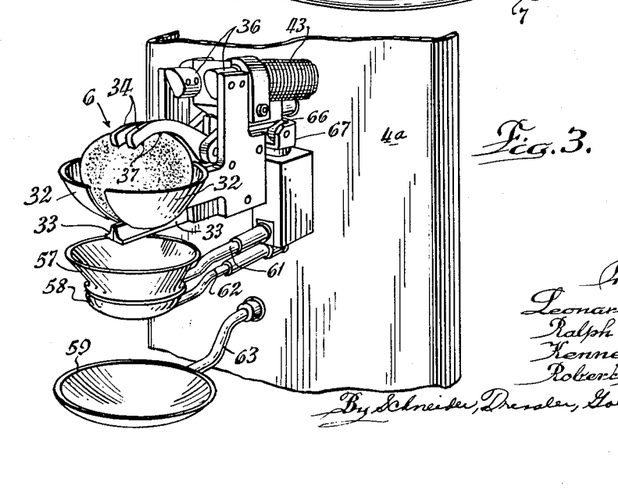
FIGURE 3 is an enlarged fragmental perspective view of an individual unit with selected egg product cups projecting from the face thereof.
Figure 4:
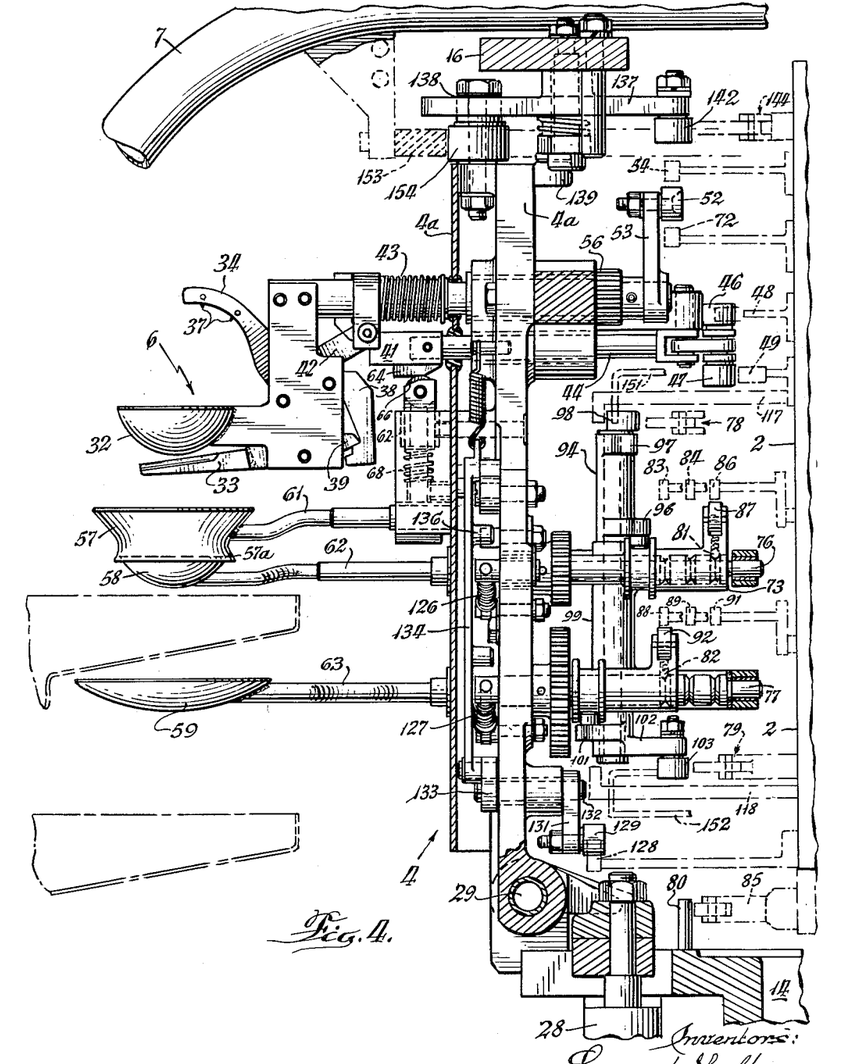
FIGURE 4 is an enlarged vertical sectional view of an egg breaking and separating unit, and includes therein, in phantom lines, the cams on the drum of the machine in FIGURE 2 in their relative operating position with respect to the cam followers on the egg breaking and separating unit.

Turning now to the details of the egg breaking and separating units, and particularly to FIGURES 2, 3, and 4, each unit 4 with its individual egg breaking head 6 is arranged to pass the various operating stations of the machine to accept an egg fed thereto, clamp the egg, cut the shell, empty the shell of its contents, either separate the yolk from the white or accumulate the whole egg or mixed egg contents, selectively dump the egg product containers at specified stations for the accumulation of egg yolks, special yolks such as "dark yolks," inedible yolks, egg whites, whole eggs, mixed eggs, and inedible whites, and then be selectively washed depending upon the nature of the egg products handled thereby.

For ease of description, the structure of an individual egg breaking and separating unit will be described, and only brief references will be made to the various cams and control devices that effectuate movement of the various components of the egg breaking and separating units. Details of the major control devices mounted on the drum 2 will be discussed in the main body of the specification, whereas the specific designs of some of the cams and common control devices will be referred to when discussing the method of operation of the machine.

The egg breaking and separating unit and the manner in which it operates, although described in substance below, is described in detail in the copending application of Leonard Shelton, Kenneth G. Jones, and Robert G. Bush, Serial No. 159,575, filed December 15, 1961, now U.S. Patent No. 3,133,569, and entitled "Egg Breaking and Separating Head Assembly."

The egg breaking head 6 has a pair of egg receiving cup halves 32, a pair of shell cutting knives 33, and a pair of clamping fingers 34 mounted in cooperative sub-assemblies, each including a cup half, a knife, and a clamping finger. Each sub-assembly is mounted for rotation about the axis of its individual mounting shaft 36.

With the fingers 34 in a raised position as shown in FIGURE 4, an egg is fed into the cup halves 32 while the cup halves are disposed in close proximity to each other as shown in FIGURE 3. (The egg feeder employed is disclosed in FIGURES 15–17 and will be described later in the specification.) The clamping fingers 34 are then lowered onto the egg shell so that the holding points 37 thereon engage the shell and firmly hold the egg in position in the cup halves for cutting. The points preferably do not pierce the egg shell, but instead settle into valleys on the surface of the shell.

When the egg is firmly clamped in place between the fingers and the cup half, the latches 38 for the knives 33 are tripped to move the lower ends of the latches rearwardly in such a manner that the rearward end 39 of each of the knives is resiliently biased pivotally to move them upwardly until they engage the undersurface of the finger 34. This distance is a preset limited amount which is determined by the shape of the egg clamped in the egg cup, and serves to sharply cut the egg shell without shattering the same and without cutting or otherwise rupturing the yolk of the egg.

The lowering of the clamping fingers 34 and the tripping of the knife latches 38 are effected by controlled movement of a control block 41 cooperatively arranged with the linkage 42 for the clamping fingers and knives. The movement of the control block 41 is cam controlled while the linkage and clamping fingers are normally biased in a downward direction by springs 43. Forward movement of the control block 41 permits the clamping fingers 34 to descend upon the egg under the influence of the springs 43 with a lost motion relation between the linkage 42 and the control bar 41 in the forward direction of movement thereof. Further forward movement of the control block 41 moves it into tripping engagement with the knife latches 38 for operation of the knife in the manner described above.

Briefly, the positions of the clamping fingers 34 and knife 33 are controlled by the movement of a reciprocating shaft 44 connected to the control block 41. To obtain this movement, there are cam followers 46, 47 secured to the shaft 44 that are adapted to be engaged at the proper time by clamping finger opening cam 48, knife tripping cam 49, and finger opening, shell dropping, and clipping cam 51 mounted on the drum 2. These cams are individually shown in FIGURE 2. The design of these cams and their location on the machine will be discussed in detail during the statement of the method of operation of the machine.

Following cutting of the egg shell, the egg breaking sub-assemblies are pivoted outwardly about their respective axes to empty the contents of the shell into an appropriate container for accepting whole eggs or containers for separately receiving the egg yolk and the egg white. The sub-assemblies are separated when a cam follower 52 secured to a crank arm 53 on the unit 4 comes into contact with a cam 54 mounted on the drum 2. The crank arm 53 is connected to one of the shafts 36 which is connected to the other shaft 36 for symmetrical movement by intermeshing gears 56 (see FIGURE 3).

If whole eggs are to be collected, a whole egg collecting cup 201 is provided beneath the egg breaking sub-assemblies. A unit of the type containing a whole egg collecting cup is indicated at 200 on FIGURE 1 of the drawings. This cup will be located in the opening provided for the egg yolk cup and will be dumped into the egg yolk receiving container to mix with the egg yolks to obtain a predetermined solids content.

If the egg yolk and egg white are to be separated, the contents of the shell are emptied therefrom through a funnel and clipper 57 and into a yolk cup 58 and a white cup 59. These cups and the funnel are mounted on posts or arms 61, 62, and 63 for controlled movement thereof. The arms 62 and 63, to which the yolk cup and the white cup are attached, are mounted in the unit so they may be rotated and their contents dumped into appropriate catch pans or basins located at preselected positions about the periphery of the machine. The funnel or clipper arm 61 is reciprocably mounted on the face of the unit 4 for cooperation of the clipper portion 57a of the funnel with the upper edge of the yolk cup 34.

This clipping operation can best be seen by referring to FIGURE 4 wherein, when the control block 41 is reciprocated, the lower surface thereof operates as a cam 41 and is followed by a roller 66 mounted on a follower mechanism 67 connected to the arm 61 and arranged for vertical reciprocating movement under the influence of a biasing spring 68.

Before leaving the egg breaking head 6, it is to be noted that after the egg products have been dumped, the clamping fingers 34 are raised by the cam 51 to release the egg shell halves from the egg cup halves to allow them to fall and be collected in a shell receiving pan 69. However, before the shells are collected they are allowed to drain into a pan 71 provided for this purpose. The head sub-assemblies are retained in the open position until they are washed or pass the washing station whereafter they are returned to their closed position by cam 72 (see FIGURE 2).

The contents of the egg dropped from the egg breaking head 6 flow through the wide mouth funnel 57 and are directed thereby to the yolk cup 58. The mouth of the funnel 57 is specially arranged to be so wide that the yolk falling from the egg shell will not fall upon the edge of the funnel; and the neck of the funnel is arranged to be so small that the yolk will not fall upon the edge of the yolk cup. During normal egg shell emptying operations, some of the egg white will precede the yolk so that it will lubricate the surface of the funnel and run into the bottom of the yolk cup before the yolk arrives in the position whereby falling movement of the yolk is cushioned and lubricated. Much of the white will overflow into the white cup 59 when the yolk and white run into the yolk cup 58. But some of the egg white will cling to the yolk and to the yolk cup. Reciprocating movement of the funnel 57 and clipper for engagement of the inner surface of the clipper portion 57a with the upper edge of the yolk cup 58 will clip off or cut the egg white that hangs onto the egg yolk or remains at the edge of the yolk cup by surface tension.

The amount of egg white which can be removed from the yolk and caused to fall into the white cup 59 may be increased by vertical oscillation of the clipper and repeated clipping action thereof before emptying the yolk cup. The clipper may be oscillated to decrease the proportion of white clinging to the yolk or hanging onto the yolk cup by cam controlling the inward and outward movement of the control block 41 or by contour control of the cam surface 64 on the control block 41.

The egg products collected in both the egg yolk cup 58 and egg white cup 59 may fall into one of three classifications, i.e., good yolk, dark or premium yolk, and inedible yolk, and good white, mixed white, and inedible whites. To this end, mechanisms must be provided so that after the contents of the cups are inspected, they may be selectively dumped into containers provided for receiving their particular contents.

Figures 10, 11, 14:
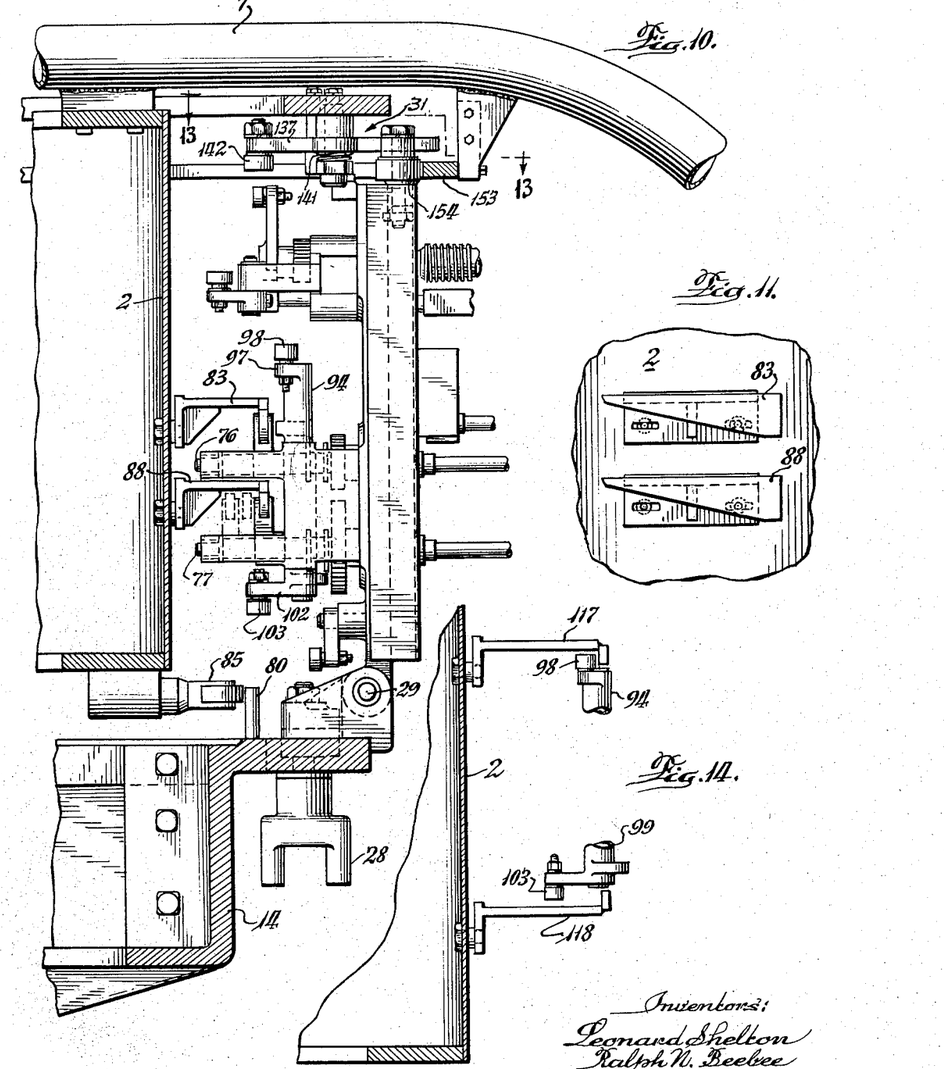
FIGURE 10 is a partial sectional view taken along lines 10—10 of FIGURE 2 with an egg breaking and separating unit located at that station of the machine.
FIGURE 11 is a face view of the egg yolk and egg white dumping cams shown in FIGURE 10.
FIGURE 14 is a sectional view in elevation of the egg yolk and egg white reset cams.

In the illustrated embodiment, this mechanism includes slide shafts 73, 74 located on shafts 76, 77 that are connected to the egg yolk and egg white shafts in such a manner that rotation of the slide shafts dumps the egg cups 58, 59. These slide shafts are adapted to be longitudinally moved to three positions by selector mechanisms 78, 79 described hereinafter. After the slide shafts are suitably positioned by the selector mechanisms, they are held in place by ball detents 81, 82. Thereafter they will be engaged by suitable cams to rotate the yolk cups 58 and white cups 59 at the station where the containers for receiving the particular products are located. Three cams 83, 84, and 86 secured to drum 2 are provided for dumping good yolks, premium yolks, and inedible yolks, respectively, when they come into contact with follower 87 secured to slide shaft 73. Disposed below these cams are cams 88, 89, and 91 for dumping good whites, mixed whites, and inedible whites, respectively, when they engage follower 92 secured to slide shaft 74. Sectional and face views of cams 83, 88 which are adapted to engage the followers 87, 92, respectively, are illustrated in FIGURES 10 and 11. Cams 84, 86, 88, and 91 are similar to cams 83, 88 and their location along with that of the containers for receiving the egg contents dumped when any of these cams engage the slide shafts 73, 74 are shown in FIGURE 3.

Figure 7:
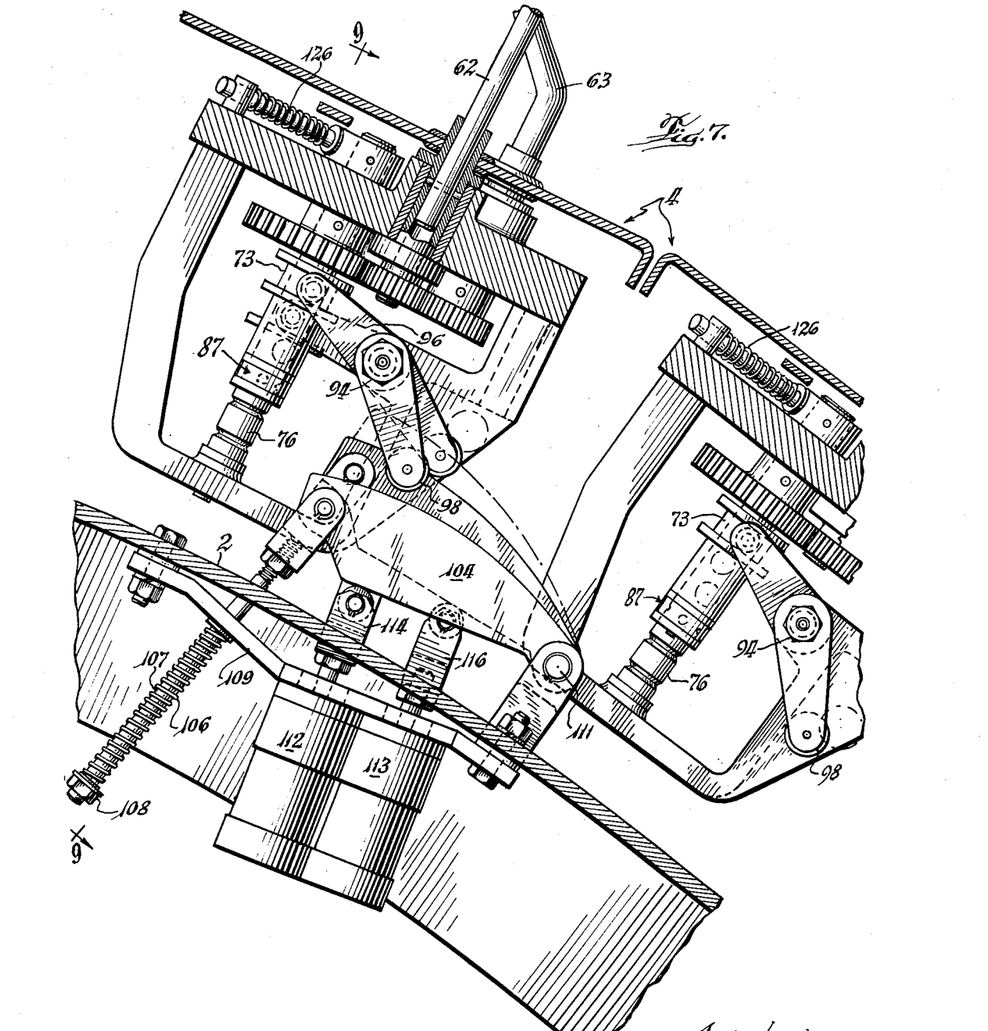
FIGURE 7 is a plan sectional view of the mechanism for selectively dumping the egg cups taken along lines 7—7 of FIGURE 9.
Figure 9:
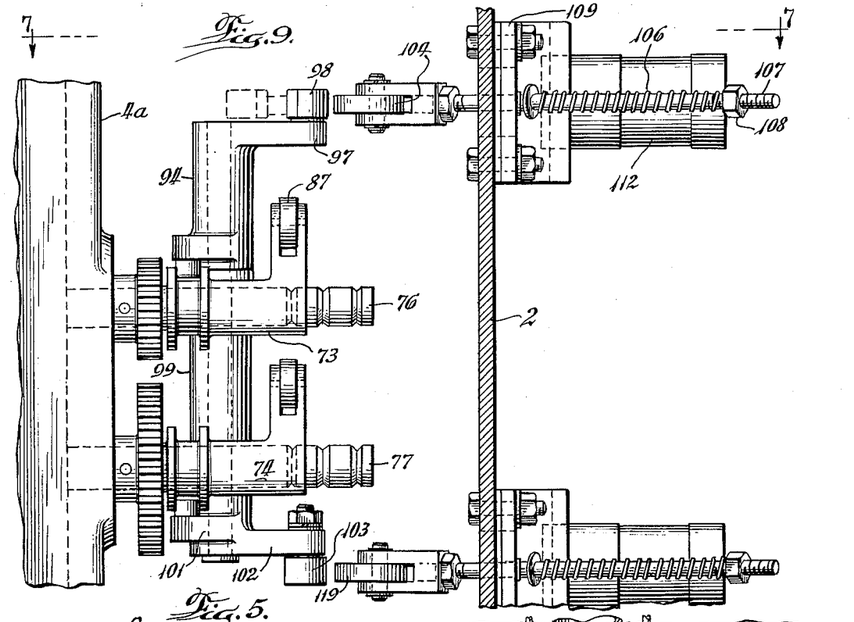
FIGURE 9 is a sectional view of the selective dumping mechanism taken along lines 9—9 of FIGURE 7.

The selector assemblies 78, 79 function to move the slide shafts 73, 74 to a preselected position by an operator at an inspection station 93 after the egg products are inspected. The slide shaft 73 is actually positioned by a pivot crank 94 that has a lower arm 96 in engagement with the slide shaft 73 and a second upper arm 97 on which is mounted a cam follower 98 to be engaged by selector assembly 78. Likewise, slide shaft 74 is positioned by a pivot crank 99 that has an upper arm 101 in engagement with slide shaft 74 and a lower arm 102 to which is connected a cam follower 103 to be engaged by selector assembly 79. The selector assemblies 78, 79 are identical and are vertically spaced, as shown in FIGURES 4, 7, and 9. The selector assemblies illustrated are actuated by an electro-pneumatic system controlled by the operator at the inspection station 93.

The selector assembly 78 for selective dumping of the egg yolk consists of an arcuate cam 104 that is pivotally mounted at one end to the drum 2 and is biased into its normal position, out of engagement with follower 98, by a compression spring 106 disposed about a rod 107 secured to the free end of the selector cam 104. The spring extends between a nut 108 on the rod and a bracket 109 secured to the drum 2 and through which the rod extends. Located between the pivotal mounting 111 for the cam 104 and the rod 107 are a pair of air cylinders 112, 113 that control the movement of piston rods 114, 116, respectively, extending therefrom. The positions of the air cylinders are controlled by the operator who after inspecting the egg cups presses a button on the selector box that actuates a solenoid valve (not shown) to direct air to one or the other of the cylinders. If the egg yolk cup contains a premium yolk, the operator directs air to cylinder 112 to extend piston rod 114 against the action of spring 106 to move cam 104 into engagement with follower 98 and rotate pivot crank 94 to move slide shaft 73 to its intermediate position. Similarly, if the egg yolk cup contains an inedible yolk, the piston rod 116 is extended to move cam 104 to engage follower 98 and rotate crank 94 to move slide shaft 73 to its outer position. When slide shaft 73 is in the inner position, the roller 87 will be in position to be engaged by cam 83 to dump good yolks; in the intermediate position to be engaged by cam 84 to dump dark yolks; and in the outer position to be engaged by cam 86 to dump inedible yolks. It is to be noted that only two air cylinders are necessary since the slide shaft 73 is returned to the normal egg yolk and egg white positions after the egg products contained in the yolk and white cups have been dumped by code reset cams 117, 118 secured to the drum 2 (see FIGURES 3, 4, and 14).

The construction of selector assembly 79 for selective dumping of egg white cup 59 is identical to selector assembly 78. The operator, by controlling the movement of cam 119, will position slide shaft 74 to the desired position by appropriate movement of pivot crank 99.

As the next unit 4 approaches the selector assemblies 78 and 79 and the operator inspection station 93, the electro-pneumatic system is reset for operator control and selectivity of dumping of the egg products held by that unit. This is done by means of a pin 80 which engages the actuator arm 85 on a control switch 90 for the valves operating the cylinders 112 and 113 for cam 104 and corresponding cylinders for the cam 119 to exhaust the same to permit the biasing spring 106 and the corresponding spring for the cam 119 to return the cams 104 and 119 to their normal positions as shown in FIGURE 2 and as shown for the cam 104 in FIGURE 4. The mechanism is then in condition for the operator to re-operate the controls for the selector assemblies 78 and 79 for selective positioning of the dumping control slide shafts 73 and 74 of the second or next unit 4. The electro-pneumatic system is so arranged that when the operator presses one of the buttons for controlling the cylinders operating the selector assemblies 78 and 79, the system will remain actuated and hold the cylinder in the desired position until the reset switch 90 is operated by engagement of the pin 80 with the actuator arm 85.

Located around the machine, for receiving the various products dumped from the egg yolk and egg white cups, are a plurality of collecting pans 121 through 125. After the slide shafts 73 and 74, and their respective cam followers 87, 92 have been selectively positioned, the egg yolk and egg white cups will be dumped when the followers are moved by the carrier 3 into engagement with their corresponding dumping cams mounted on the drum 2. As illustrated in FIGURE 2, the cams 83, 88 (shown congruently) which are adapted to engage the rollers 87, 92 when they are in the good yolk and good white positions are secured to the drum 2 above the egg yolk collecting pan 121 and an egg white collecting pan (not shown) located below pan 121 but extending the full arcuate distance between the adjacent radial spokes. Circumferentially spaced from the cams 84, 85 in a counter-clockwise direction is cam 84 which engages the follower 87 when the slide shaft 69 is in the intermediate position to dump dark or premium egg yolks. The pan 122 for collecting these yolks is located beneath the egg yolk cup to receive the contents dumped at this station of the machine.

The cams 86, 89 for dumping inedible egg yolk and mixed whites, respectively, are secured to the drum on the circumference thereof adjacent collecting pans 123, 124. Thus, when the slide shaft 73 is located in its extreme outer position, the cam 86 will contact the roller 87 to dump the inedible egg products from the yolk cup into pan 123 that extends the full arcuate distance between adjacent spokes. The cam 89 is positioned to engage the roller 92 when the slide shaft 74 is in its intermediate position to dump mixed white products from the egg white cup into collector pan 124. Circumferentially spaced from the cam 89 is cam 91 which is designed to engage follower 92 when the slide shaft 74 is in its extreme outward position to dump the inedible white products found in the egg white cup into collector pan 125.

After the cups 58, 59 have been dumped, they are retained in the dumped position by toggles 126 and 127, respectively. The cups are subsequently returned to the upright position by a cup reset cam 128 on the drum 2 that engages a follower 129 disposed on a crank 131 which is connected by a shaft 132 to a second crank 133. The free end of the crank 133 is pivotally connected to an upwardly spring biased link 134 having rearwardly projecting pins 136 disposed so that downward movement of the link 134, which occurs as the follower 129 rides on the surface of the cup reset cam 128, will reverse the position of the toggles 126 and 127 and rotate the shafts 76 and 77 back to their normal position with the cups 58 and 59 opening upwardly.

When the emptying operation has been completed, selective heads may be washed, rinsed, sanitized, and dried or all of the heads may be so treated, as desired, without interruption of the operation of the machine. For this purpose, each of the units is pivotally mounted as at 29 on the rotating support ring 14 and held in an upright position by a cam controlled latch mechanism 31 carried by the rotating latch ring 16.

The latch mechanism 31 consists of a latch plate 137 that is pivotally mounted to the latch ring 16. The plate 137 has a hook portion 137a adapted to engage a roller 138 connected to the upper portion of the egg breaking and separating unit. There is also provided a throw-out lever 139 that is pivotally mounted to the latch ring and a throw-out spring 141 that maintains the hook latched and biases the throw-out lever 139 against the back surface of the main support plate 4a of the egg breaking and separating unit. Connected to the end of the latch portion opposite to the hook is a cam follower 142, which when engaged by a wash latch release cam 143 moves the hook out of engagement with the roller 138 and allows the spring biased lever 139 to bias the egg breaking and separating unit out of its vertical position. The wash latch release cam 143 is part of an unlatching mechanism 144 that is provided to release the egg breaking and separating unit from the upper rotating latching ring 16 when the unit is to be washed.

Figure 13:
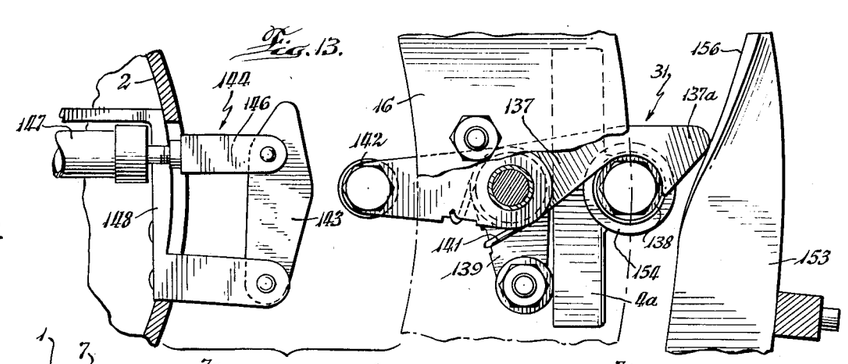
FIGURE 13 is a plan view of the latching mechanism holding the egg breaking and separating unit in a vertical position taken along lines 13—13 of FIGURE 10.

The wash latch release cam 143 is positioned by the piston rod 146 of wash cam cylinder 147 mounted on a bracket 148 secured to drum 2. The cam 143 is pivotally connected at one end to the bracket 148 and when the air is supplied to the cylinder 147, the cam 143 is moved clockwise, as shown in FIGURE 13, to be engaged by the cam follower 142 on the latch.

The flow of air to wash cam cylinder 147 is controlled by a solenoid valve (not shown), the position of which is regulated by a set of latch trip operating switches 149 with operating arms 151 and 152, respectively. As illustrated in FIGURE 4, the switch arm 151 is arranged with a dependent portion disposed to be engaged by the follower 98 on the crank 94 for the slide shaft 73 only when the follower 98 has been moved to its third dumping position by the selector assembly 78, which position is the inedible yolk position. Thus, an egg breaking and separating unit having a follower 98 in this position will bring the follower into engagement with the arm 151 to operate the switch 149 and the switch will energize the solenoid control valve to direct air to the cylinder 147. When the latch trip cam 143 is extended by this arrangement, it will be engaged by follower 142 to trip the latch 31 thereby freeing the unit 4 from the roller on the upper end thereof to allow the egg breaking and separating head to pivot forwardly and downwardly by gravity about its mounting 29 to go through the washing, rinsing, and sanitizing stations, as described hereinafter.

The same operations are effected if the switch arm 152 is engaged by the follower 103 on the pivot crank 99 for the white cup control slide shaft 74 located at the lower portion of the unit (see FIGURE 3). The arm 152, however, has an elongated portion for engagement by the follower 103. The arm 152 will be engaged to trip a switch 149 or an equivalent counterpart thereof for actuation of the cylinder 147 whenever the slide shaft 74 is in position for dumping the white cup at either the second or the third dumping stations. That is, if the selector assembly 79 is positioned to move the follower 103 and slide shaft 74 to either the mixed white or inedible white positions when the unit passes the dumping coding stations, the follower 103 will engage the arm 152 of the switch system controlling the cylinder 147 to cause opening of the latch 34 to release the unit to wash, rinse, sanitize, and dry all the egg contacting parts. If desired, a special head washing button could be provided on the control panel 93 to actuate cylinder 147 to wash all of the egg breaking and separating units.

The unlatching mechanism 144 for the egg breaking and separating units is located opposite one end of a safety rail 153. Rail 153 extends approximately two-thirds the distance around the machine and is adapted to be contacted by roller 154 secured to support plate 4a to prevent the units from falling and being damaged in the event they become unlatched. Between the ends of the safety ring 153 is a wash track 156 which is secured to the stationary frame 1. As seen in FIGURE 2, the wash track 156 is so contoured as to cause the unit located thereon (after the latching mechanism has been released) to be lowered to a horizontal position into tank 157, as indicated by the position of the unit 4a in the lower left-hand portion of FIGURE 2. As the unit 4 rides along the track 156, it is lowered and raised so that all of the egg contacting elements thereof in front of the face plate 4a dip into and are raised out of a washing pan 157 and rinsing, sanitizing, and drying pan 158. The washing pan may contain proper washing solutions and in the embodiment shown, the solution is ultrasonically energized for high efficiency cleaning by five ultrasonic units 159. Within the pan 158 there are provided suitable spraying and blowing pipes 161, 162, respectively, for rinsing and sanitizing.

At the end of these phases of operation, the track 156 carries the unit back to its fully raised position up the final rise where the spring biased latch mechanism 31 catches and holds the unit 4 in the vertical position.

It remains to note that when one of the switches 149 is operated for movement of the latch trip cam 143, the system controlling the cylinder 147 will keep the cam extended until the system is reset for control by the next approaching unit 4. As the next succeeding unit 4 approaches one of the switch arms 151 and 152, the system will be reset by engagement of a pin 80 mounted adjacent each unit on the mounting ring 14, with the actuator arm 164 of a switch 165.

Washing, and so forth, is necessary whenever an egg of inedible contents is handled. In machines following heretofore known methods of automatic handling, it was necessary to stop the machine or remove the portion of the machine handling the egg. It was also necessary to stop fully the machine whenever it was desired to wash down all of the egg handling devices. In addition, when portions of the machine handled eggs wherein the yolks were broken, so that mixed eggs resulted, it was also necessary to remove those portions of the machine to effect washing thereof. It will be readily observed that with the machine of the present invention, individual units may be separately washed or the units may be successively washed during ordinary cycling of the machine without any interruption of the movement and cycling operation thereof.

Following relatching of the unit, the unit approaches a cup reset cam 128 and a head closing cam 166. The head closing cam 72 is engaged on its upper surface by the follower 52 for repositioning and partially rotating the shafts 36 of the clamping and breaking head sub-assemblies to bring the cup halves 32 and knife portions 33 back together to form a complete cup and breaking knife arrangement with the clamping fingers 34 disposed parallel and adjacent to each other for commencement of recycling of the entire machine.

Figure 15:
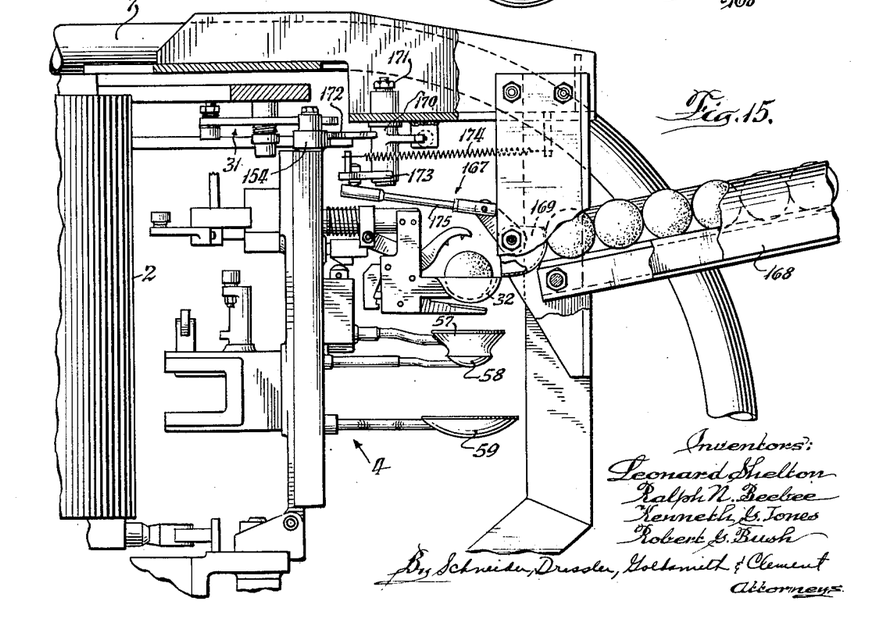
FIGURE 15 is a side elevation of the egg feeding mechanism taken along lines 15—15 of FIGURE 2.
Figures 16, 17:
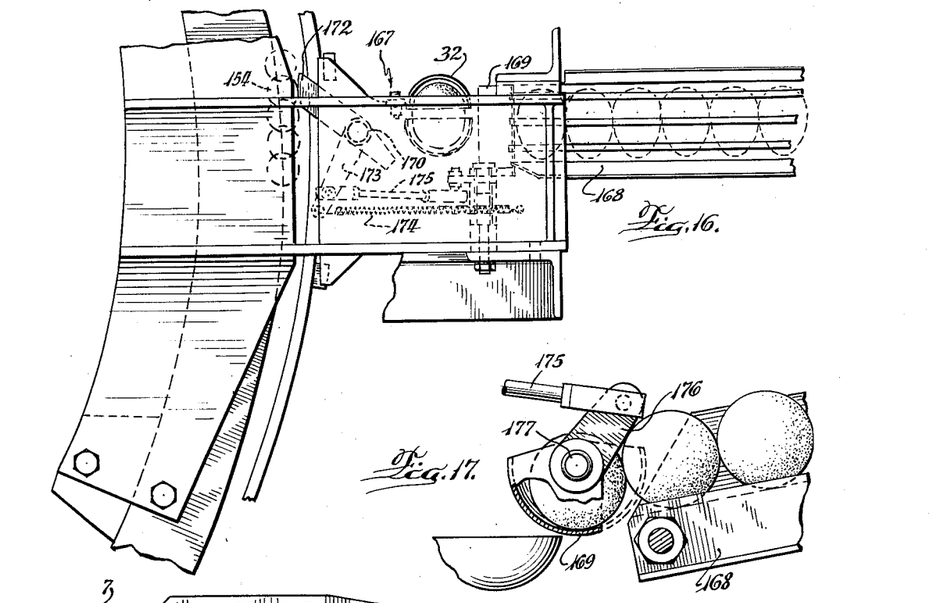
FIGURE 16 is a plan view, with parts broken away, of the egg feeding mechanism shown in FIGURE 15.
FIGURE 17 is a detail view of the arcuate gate controlling the feeding of the eggs between the egg feeder assembly and the egg holding cup of an egg breaking and separating unit.

The eggs can be fed to the egg breaking and separating units in many different ways. This could include the manual placing of the eggs in the egg cup 32 or the eggs could be located therein by an automatic feeding apparatus. An automatic feeding apparatus 167 that could be used is disclosed in FIGURES 15 through 17 of the present application. The eggs are directed down a trough 168 and they are individually placed into an egg cup 32 mounted on an egg breaking and separating unit when the cup 32 is located immediately adjacent the trough. This placing of the egg in the cup is synchronized with the movement of each unit 4 by means of a feeder control mechanism that is positioned by the roller 154 secured to the face plate 4a of each egg breaking and separating unit. The feeder control mechanism regulates the position of a combination egg holder and gate 169 that controls the movement of the eggs in the trough 168. The egg holder and gate 169 is shaped to hold an egg as shown in FIGURE 17 and is then positioned to prevent subsequent eggs from moving down the trough after the egg originally contained therein is placde in an egg cup as shown in FIGURE 15.

The feeder control mechanism consists of a pivot crank 170 that is rotatably mounted on a pin 171 that fixes the crank 170 in position relative to the main frame support 1. The crank 170 has an upper arm 172 that is adapted to be engaged by the roller 154 and a lower arm 173 that is resiliently biased in a counterclockwise direction by a spring 174 (see FIGURE 16). Connected to the arm 173, inwardly of spring 174, is a link 175 that is connected at its other end to an arm 176 of the egg holder and gate 169 that is rotatably supported by a pin 177 extending through a support plate connected to the feeder frame. The return spring 174 normally biases the pivot crank 170 into the position in which the egg holder 169 is located as shown in FIGURE 17.

When the roller 154 on an egg breaking and separating unit engages the crank arm 172, an egg cup 32 is in position to receive an egg from the feeder mechanism. The roller 154, through arm 172, moves the pivot crank 170 in a clockwise direction (see FIGURE 16) against the action of spring 174 to move the arm 176 and holder 169 in a counterclockwise direction to the position shown in FIGURE 15. In this position the egg will drop from the holder 169 into the egg cup 32 on the unit and the egg holder and gate 169 of the feeder is in position to block the movement of subsequent eggs down the trough. After the roller 154 has passed the pivot crank arm 170, the spring 174 returns the pivot crank 170, link 175, and egg holder and gate 169 to the position shown in FIGURE 17 to receive another egg and prevent the eggs from moving out of the trough until another unit moves into position to receive an egg.

The method of operation of the machine for processing eggs and egg products may be understood most conveniently by juxtaposing FIGURES 2 and 4. The operation will be explained assuming a starting position indicated generally at 180 and with the units of the machine arriving at point 180 on FIGURE 2 in such condition that the head sub-assemblies are in the closed position so that the cup halves form a complete cup.

From this starting position, the carrier 3 with the units 4 mounted thereon is moved in a counterclockwise direction, as viewed in FIGURE 2, at a rate controlled by the drive of the machine. The first operation effected is controlled by the movement of the mechanism into engagement with the clamping finger opening cam 48 having a rapid rise 48a, a dwell 48b, and an elongated drop-off 48c. The cam 48 is engaged by the follower 46 to move the reciprocating shaft 44 to withdraw the clamping fingers 34 and set the knife latches 33. The mechanism is held in this condition as it passes along the dwell 48b, during which time it passes the feeder mechanism 167. As it passes along the dwell 48b, the roller 154 on the unit engages the feeder crank arm 172 to rotate the egg holder and gate 169 to deposit an egg in the egg cup (see FIGURES 15 to 17). When the roller 154 passes the arm 172, the egg holder and gate 169 is spring biased into position to block the feeding of any more eggs until the roller 154 on a succeeding unit comes into engagement with the feeder mechanism.

With an egg in the closed cup halves, the unit continues its counterclockwise travel so that the follower 46 rides on the descending face 48c of the cam 48 to bring the fingers 34 into clamping contact with the egg.

At the next stage of movement of the machine, the tripping cam 49 engages the follower 47 to trip the knife latch 38 to cut the egg shell. The distance between the knife in the latched position and the undersurface of the clamping fingers adjacent the knife rearwardly of the egg cup halves limits the penetration of the knife 33 into the shell between the opposed clamped portions of the shell held by the individual sub-assemblies so that the sharp movement of the knife cleanly cuts the shell and does not break the surface membrane on the yolk.

Following the cutting action, as the machine continues its counterclockwise movement, the unit passes cam 54 to open the head and at the same time engages a dual set of cams 117, 118 to move the slide shafts 73, 74 to the position wherein the egg yolk cup and egg white cup will be dumped into containers for receiving good yolks and good whites. The egg contents are then dumped from the shell either through a funnel 54 into the yolk cup 58 and white cup 59, or into a whole egg cup, as selectively desired.

Further counterclockwise movement of the rotatable carrier brings the pin 80 mounted on the unit into engagement with an actuator arm 85 that actuates a solenoid valve to release the selector assemblies 78, 79 to permit the springs 106 to move the cams to a position where they are out of contact with the unit. It is noted at this time that a pan 71 is located below the unit to collect egg products that overflow from the egg cups or drain from the egg shells after they were emptied into the egg yolk and egg white cups.

The operator at the selector station 93 inspects the contents of the egg cup to see the condition of the egg yolk and egg white. If the yolk in inedible, she presses a button to actuate the cylinder 113 to move the slide shaft 73 into a position where it will be subsequently rotated to dump the yolk cup contents into a pan for collecting such yolks and if the yolk is a dark or premium yolk, she energizes cylinder 112 to move the slide shaft 73 into a position where the yolk will be dumped into an appropriate container. This operation is repeated after inspection is made of the condition of the egg white in the egg white cup. If the egg white and yolk are good, then she does not press any buttons, since the resetting cams 117, 118 move the slide shafts to a position where they will be engaged by cams 83, 88 to dump the cups into pans for collecting good egg yolks and egg whites.

Further counterclockwise movement of the unit brings it into engagement with the finger opening, shell dropping, and white clipping cam 51. This cam is engaged by the follower 46 to move the control block 41 to raise the fingers, thereby unclamping and dropping the opposed egg shell portions from each of the head sub-assemblies into a disposal pan 69.

As the follower reaches the maximum height and dwell portion 51a of the cam 51, the cam surface 64 on the control block 41 operates against the follower 66 to cause the upper edge of the yolk cup 58 to be borne down upon by the clipping portion 57a of the funnel 57 to effect clipping. The dwell portion 51a of the cam 51 may have an extended length with a corrugated or serrated configuration to cause longitudinal oscillation of the shaft 44 and reciprocation of the clipper for multiple stage clipping of egg white from the egg yolk as discussed hereinbefore, if so desired. Of course, the same multiple clipping effect may be obtained by the provision of a plurality of cams similar to the cam 51, if so desired.

As the carrier 3 continues its rotation in a counterclockwise direction, it first passes cams 83, 88 which will engage cam followers 87, 92 if they have been positioned by the selector assemblies to dump good yolks into pan 121 and good whites into a collector pan disposed below pan 121 (not shown). If the slide shaft 74 has been positioned to dump dark or premium yolks, the follower 87 will contact cam 84 to dump the egg yolk into collector pan 122. Furthermore, if the slide shafts 73, 74 have been positioned to dump inedible yolks or mixed whites, the followers 87, 92 will come into engagement with cams 86, 89 to dump the contents of the egg yolk and egg white cups into collector pans 123 and 124. If, finally, the slide shaft 74 has been positioned to dump inedible whites, the follower 92 will come into engagement with cam 91 to dump the egg white cup into collector pan 125.

After the unit 4 passes the selective dumping stations for the various collector pans, it approaches the washing, rinsing, and sanitizing stations. First, however, the pin 80 adjacent the unit engages an actuator arm 164 of switch 165 to release the latch trip cam 143 so that the setting of the unit approaching the cam 143 will be the sole determining factor if the particular unit is to be washed. If the pivot crank 94 and slide shaft 73 have been positioned to dump inedible yolks, or the pivot crank 99 and slide shaft 74 have been positioned to dump mixed whites or inedible whites, the followers 98, 103 on the pivot cranks 94, 99, respectively, will contact the switches 151, 152, respectively. The contacting of these switches positions a solenoid valve to direct air to the air cylinder 147 to move the wash release cam 143 into position where it will come into contact with the roller 142 on the latch mechanism 31. Engagement of the roller 142 with cam 143 unlatches latch 31 to permit the egg breaking and separating unit to be biased outwardly into engagement with the wash track 156. If the egg breaking and separating unit has handled good yolks or premium yolks, and good whites, the latching mechanism will not be unlatched and the units will remain in a vertical position relative to the rotating carrier 3.

The unit that is unlatched follows the track 156 into the washing pan 157 where the egg products are washed off from the egg yolk and egg white cups.

Further counterclockwise movement of the units moves them up out of the pan 157 into a rinsing and santizing tank 158. After the heads are rinsed and sanitized, they are moved up the last rise of track 156 and along with the units that were not washed will be moved into engagement with the cams 128, 72 to reset the cups and close the egg breaking and separating head. The unit is then in position to receive an egg from the egg feeder and to be recycled.

It will also be appreciated that numerous other modifications and variations may be effected within the true spirit and scope of the novel concepts of the invention and without departing therefrom. For example, the invention is not limited to a cylindrical type of carrier, since it could work equally well if the carrier and support therefor on which the controls are mounted extended in a longitudinal direction. Furthermore, it will be appreciated that, if desired, the units could be maintained in a stationary position and the support member containing actuating cams could be moved relative thereto. It is also obvious that the cams, selector mechanisms, and other control devices are merely illustrative and could be replaced by other apparatus capable of performing the same functions.

We claim:

1. A machine for processing eggs and egg products comprising a first support; a second annular support rotatably mounted relative to said first support; a plurality of egg breaking and separating units mounted on said annular support; means for driving the annular support relative to the fixed support; each egg breaking and separating unit comprising an egg holder, means for clamping and cutting an egg disposed in said egg holder, means for splitting the egg to empty the contents thereof, a first cup disposed below said egg holder and being smaller in volume than the contents of the egg whereby it receives and contains the egg yolk and the egg white overflows therefrom, a second cup larger than the first cup and spaced directly below said first cup to receive the overflow from said first cup, means rotatably mounting said first and second cups relative to said unit, means for rotating said cups, and means for selectively positioning said cup rotating means; means on said first support for adjustably positioning said selective positioning means as determined by the condition of the egg contents; and control means on said first support for selectively engaging said cup rotating means to dump the cups into appropriate containers.

2. An egg handling machine comprising a fixed support member; an annular carrier member rotatably mounted on said fixed support member; means for driving said annular carrier member relative to said fixed support member; a plurality of egg breaking and separating units mounted around the circumference of said annular carrier member; each egg breaking and separating unit comprising an assembly for breaking an egg and emptying the contents therefrom, a first cup disposed below said assembly and smaller in volume than the contents of the egg whereby the egg yolk will be retained therein and the egg will overflow therefrom, a second cup below said first cup and larger than said first cup to receive the egg white overflowing from the first cup, a funnel and clipping means disposed above said first cup for directing the egg contents into said first cup, means for supporting and vertically moving the funnel and clipping means relative to said unit, whereby it can be moved into and out of clipping engagement with the first cup, means rotatably mounting said first and second cups relative to said unit, means for rotating said cups; means for selectively positioning said egg cup rotating means, first control means on said support member for actuating said assembly for breaking an egg and emptying the contents therefrom, second control means on said fixed support for controlling the position of said selective positioning means, and third control means on said support for engaging said cup rotating means to dump the cups as determined by said second control means.

3. A machine for handling eggs and egg products including a main support; a carrier rotatably mounted on said support, means for rotating said carrier; a plurality of egg breaking and separating devices mounted around the circumference of said carrier each comprising an egg breaking head and a container means disposed below said head for collecting and separating the contents of an egg received from the egg breaking head, means for positioning said container means for selective dumping thereof, means for retaining the containers in the dumped position, and means for resetting the containers to their normal position to receive a subsequent egg; control means on said main support for determining the position of said selective positioning means, and actuating means on said support for selectively engaging said container means to dump the cup.

4. A machine for handling eggs and egg products including a support assembly, a carrier member movably mounted on said support assembly, means for driving said carrier, a plurality of egg breaking and separating devices mounted around the perimeter of said carrier, each of said devices comprising an egg breaking head and cup means for separately receiving the egg yolk and egg white, collecting means for receiving products dumped from said cups, selector means on said support assembly for positioning the cup means to provide for selective dumping, means on said support assembly for selectively dumping said cups into the collecting means, and reset means on said support for deactuating said selector means to permit resetting thereof by an approaching egg breaking and separating unit.

5. A machine for handling eggs and egg products including a support, a carrier rotatably mounted on said support, means for driving said carrier, a plurality of egg breaking and separating units pivotally mounted on said carrier, selector means for selectively dumping products from said egg breaking and separating units, a latching mechanism for securing said units relative to said carrier, means for cleaning said units, means for directing said units through said cleaning means, latch release means secured to said support for unlatching said units adjacent said directing means, and control means for said latch release means responsive to said selector means whereby the units may be selectively washed by said cleaning means.

6. A machine for handling eggs and egg products including a support assembly, a carrier member movably mounted relative to said support assembly, means for driving said carrier member, a plurality of egg breaking and separating units mounted on said carrier and including an egg breaking head and cup means for separately collecting the egg yolk and egg white, means for automatically feeding eggs to said egg breaking head, interengaging means on said carrier and support assembly for operating said egg breaking head, selector means for positioning said cup means for selective dumping thereof, means for selective dumping of said cup means, and means for washing said units.

7. A machine for handling eggs and egg products including a support assembly, a carrier member movably mounted relative to said support assembly, means for driving said carrier member, a plurality of egg breaking and separating units mounted on said carrier and including an egg breaking head and cup means for separately collecting the egg yolk and egg white, means releasably supporting said units relative to said carrier, means for automatically feeding eggs to said egg breaking head, interengaging means on said carrier and support assembly for operating said egg breaking head, selector means for positioning said cup means for selective dumping thereof, means for selective dumping of said cup means, means for washing said units, and means responsive to said selector means to control the movement of said releasably supporting means whereby the units may be selectively washed.

8. A machine for handling eggs and egg products including a support assembly, a carrier member movably mounted relative to said support assembly, means for driving said carrier member, a first plurality of egg handling units mounted on said carrier for collecting whole eggs and each including an egg breaking head and first container means for collecting whole eggs and, a second plurality of units for separately collecting the egg yolk and egg white, each including an egg breaking head and cup means for separately collecting the egg yolk and egg white, means for automatically feeding eggs to said egg breaking heads, interengaging means on said carrier and support assembly for operating said first and second egg handling units, selector means for positioning said first and second egg handling units for selective dumping thereof, and means for selective dumping of said egg handling units whereby egg solids of a predetermined content can be obtained.

9. A machine for handling eggs and egg products including a main support, a carrier movably mounted relative to said main support, means for moving said carrier, a plurality of egg breaking and separating units mounted on said carrier, means for cleaning said units, means for controlling the movement of said units relative to said carrier, and means for selectively operating said control means for directing preselected units through said cleaning means.

10. A machine for handling eggs and egg products including a main support, a carrier movably mounted relative to said main support, means for driving said carrier, a plurality of egg handling units mounted on said carrier each including an egg breaking head and container means for collecting the contents of the eggs when broken, said container means comprising a first cup disposed below said egg breaking head for receiving the egg yolk and a second cup larger than said egg cup and disposed immediately below said first cup to receive the egg contents overflowing from said first cup, means for positioning said first and second cups for selective dumping thereof, means for selectively dumping said cups, means for washing the egg breaking head and egg cups mounted on said egg handling units, means for controlling the movement of said units into said washing means, said control means being responsive to said selective dumping means whereby only selected heads will be washed.

References Cited in the file of this patent
UNITED STATES PATENTS

| | | |
|---|---|---|
| 1,507,221 | Weiss | Sept. 2, 1924 |
| 1,997,881 | Drexel | April 16, 1935 |
| 2,160,319 | Swartz | May 30, 1939 |
| 2,718,906 | Adams | Sept. 27, 1955 |
| 2,966,184 | Willsey | Dec. 27, 1960 |
| 3,082,804 | Shelton | Mar. 26, 1963 |